(12) United States Patent
Meo et al.

(10) Patent No.: US 11,811,647 B2
(45) Date of Patent: *Nov. 7, 2023

(54) TECHNIQUE FOR DYNAMIC DISCOVERY, UPDATE AND PROPAGATION OF MULTICAST STREAM CAPABILITIES IN A CAPABILITY-AWARE NETWORK

(71) Applicant: Cisco Technology, Inc., San Jose, CA (US)

(72) Inventors: Francesco Meo, San Jose, CA (US); Stig Ingvar Venaas, Oakland, CA (US); Rahul Savarapu Parameswaran, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/846,564

(22) Filed: Jun. 22, 2022

(65) Prior Publication Data

US 2022/0321454 A1    Oct. 6, 2022

Related U.S. Application Data

(63) Continuation of application No. 16/426,377, filed on May 30, 2019, now Pat. No. 11,405,306.

(51) Int. Cl.
*H04L 45/16* (2022.01)
*H04L 45/02* (2022.01)
(Continued)

(52) U.S. Cl.
CPC .............. *H04L 45/16* (2013.01); *H04L 45/02* (2013.01); *H04L 45/34* (2013.01); *H04L 45/38* (2013.01); *H04L 65/611* (2022.05)

(58) Field of Classification Search
CPC ......... H04L 12/28; H04L 12/18; H04L 12/44; H04L 12/40; H04L 12/66; H04L 12/741; H04L 12/751; H04L 12/761; H04L 12/801; H04L 12/185; H04L 45/16; H04L 45/00; H04L 45/28; H04L 45/12; H04L 45/74; H04L 45/026; H04L 47/15; H04L 45/48; H04L 45/586; H06L 45/42
(Continued)

(56) References Cited

U.S. PATENT DOCUMENTS 6,563,830 B1 * 5/2003 Gershon ............... H04L 12/185
370/395.53
7,061,880 B2    6/2006 Basilier
(Continued)

*Primary Examiner* — Man U Phan
(74) *Attorney, Agent, or Firm* — Polsinelli

(57) ABSTRACT

Systems and methods provide for the dynamic discovery, update and propagation of multicast streams capabilities in a network. An endpoint can be coupled to a first hop router in a network environment. The first hop router can discover multicast flow characteristics information associated with the endpoint and propagate the multicast flow characteristics information of the endpoint to additional network nodes in the network environment. The first hop router and at least a portion of the additional network nodes can form one or more multicast flows associated with the endpoint through the network environment using the multicast flow characteristic information associated with the endpoint.

20 Claims, 4 Drawing Sheets

(51) Int. Cl.
  *H04L 45/00*     (2022.01)
  *H04L 65/611*    (2022.01)

(58) Field of Classification Search
  USPC .......................................................... 370/351
  See application file for complete search history.

(56) References Cited

U.S. PATENT DOCUMENTS

| | | | |
|---|---|---|---|
| 7,644,177 B2 * | 1/2010 | Kouvelas | H04L 45/16 |
| | | | 709/228 |
| 8,009,668 B2 | 8/2011 | Bare et al. | |
| 8,289,893 B2 | 10/2012 | Kim et al. | |
| 8,804,722 B2 * | 8/2014 | Appalla | H04L 45/04 |
| | | | 370/390 |
| 8,817,782 B2 * | 8/2014 | Appalla | H04L 12/462 |
| | | | 370/390 |
| 9,077,551 B2 | 7/2015 | Chandrashekharachar Suvarneshwar | |
| 9,077,663 B2 | 7/2015 | Bare et al. | |
| 9,106,593 B2 | 8/2015 | Singh et al. | |
| 9,118,564 B2 * | 8/2015 | Han | H04L 47/10 |
| 9,160,553 B2 | 10/2015 | Wu et al. | |
| 9,160,683 B2 * | 10/2015 | Han | H04L 47/806 |
| 9,252,964 B2 | 2/2016 | Singh | |
| 9,325,605 B2 * | 4/2016 | Venaas | H04L 45/16 |
| 9,641,417 B2 | 5/2017 | Jiang et al. | |
| 9,660,898 B2 | 5/2017 | Peter et al. | |
| 9,674,075 B1 | 6/2017 | Nagarajan et al. | |
| 9,762,403 B2 | 9/2017 | Keesara et al. | |
| 9,819,505 B2 | 11/2017 | Bhat et al. | |
| 9,832,290 B2 | 11/2017 | Manur et al. | |
| 9,838,303 B2 * | 12/2017 | Nagarajan | H04L 45/16 |
| 9,843,513 B2 * | 12/2017 | Nagarajan | H04L 45/026 |
| 9,998,291 B1 | 6/2018 | Khan et al. | |
| 9,998,292 B2 | 6/2018 | Asthana et al. | |
| 10,104,139 B2 * | 10/2018 | Kebler | H04L 12/1886 |
| 10,171,345 B2 | 1/2019 | Menezes et al. | |
| 10,264,040 B2 | 4/2019 | Manohar et al. | |
| 10,536,285 B2 * | 1/2020 | Nagarajan | H04L 69/324 |
| 10,659,344 B2 | 5/2020 | Wang et al. | |
| 10,686,699 B2 * | 6/2020 | Duncan | H04L 12/4641 |
| 10,700,938 B2 | 6/2020 | Chhibber et al. | |
| 10,841,111 B2 | 11/2020 | Zhang | |
| 10,855,579 B2 * | 12/2020 | Mishra | H04L 45/741 |
| 10,862,697 B2 * | 12/2020 | Mishra | H04L 12/1886 |
| 10,862,933 B2 | 12/2020 | Manohar et al. | |
| 11,038,794 B2 * | 6/2021 | Meo | H04L 45/125 |
| 11,070,386 B2 * | 7/2021 | Kebler | H04L 12/1886 |
| 2018/0367451 A1 * | 12/2018 | Gulrajani | H04L 45/54 |
| 2019/0386881 A1 * | 12/2019 | Dutta | H04L 45/48 |
| 2020/0076767 A1 * | 3/2020 | Venaas | H04L 45/22 |
| 2020/0280455 A1 | 9/2020 | Mishra et al. | |
| 2020/0287737 A1 | 9/2020 | Mishra et al. | |
| 2021/0014159 A1 * | 1/2021 | Mishra | H04L 45/48 |

* cited by examiner

TECHNIQUE FOR DYNAMIC DISCOVERY, UPDATE AND PROPAGATION OF MULTICAST STREAM CAPABILITIES IN A CAPABILITY-AWARE NETWORK

CROSS-REFERENCE TO RELATED APPLICATION

The instant application is a Continuation of, and claims priority to, U.S. Pat. No. 11,405,306 entitled TECHNIQUE FOR DYNAMIC DISCOVERY, UPDATE AND PROPAGATION OF MULTICAST STREAM CAPABILITIES IN A CAPABILITY-AWARE NETWORK, filed May 30, 2019 and issued Aug. 2, 2022, the contents of which are herein incorporated by reference in its entirety.

TECHNICAL FIELD

The present disclosure relates generally to multicast streams, and more particularly, to systems and methods for forming multicast flows through an enterprise network.

BACKGROUND

Bandwidth usage is controlled through the management of flows. A flow is a stream of packets that all have certain characteristics, such as the port number or destination address. These flows are managed by transport, service, or virtual machine, including zones. Flows cannot exceed the amount of bandwidth that is guaranteed to the application or to the customer's purchased share without packet drops or other errors. For flows directed to multiple receiving devices (e.g., one-to-many or many-to-many distributions), a network can include multicast capabilities, which is a group communication where data transmission is addressed to a group of destination computers simultaneously.

Currently, administrators have to manually configure bandwidth requirements for every node. For example, administrators must apply the configuration (or an updated configuration) to each node of the network, which can range to more than hundreds of devices that are continuously added, replaced, or removed from the network. In Bandwidth Aware Multicast systems, a flow can be provisioned, but the provisioning requires manual configuration of flow capabilities. An administrator must then configure bandwidth requirements for specific Multicast groups, and the flows are stitched with the guaranteed bandwidth. For example, this can be done through link selection for reverse path forwarding (RPF), and with the outgoing interface (OIF) bandwidth requirements in mind. These links should not be over-provisioned. Moreover, any network failures can also be corrected with bandwidth guarantees in mind.

If any of the nodes are temporarily unreachable from the controller at the time of the manual configuration, there will be inconsistencies in the network configuration, and then the network can misbehave. Administrators must configure all the flow policies of all the multicast groups that will eventually show up during the life of the network regardless of the fact that not all the groups will be in the network at the same time. Because a flow might take any path in the solution depending on bandwidth availability at time of flow inception, bandwidth awareness is required at every node in the fabric. This means that configuration scale can go up dramatically, exponentially increasing the burden on Administrators to configure flows, especially if we have to specify a different profile for any given source and group of nodes instead of just the group of nodes as required in many cases.

What is needed is a way to configure the network for multicast flows in a scalable way without manual Administrator intervention.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DESCRIPTION OF EXAMPLE EMBODIMENTS

Figure 1:
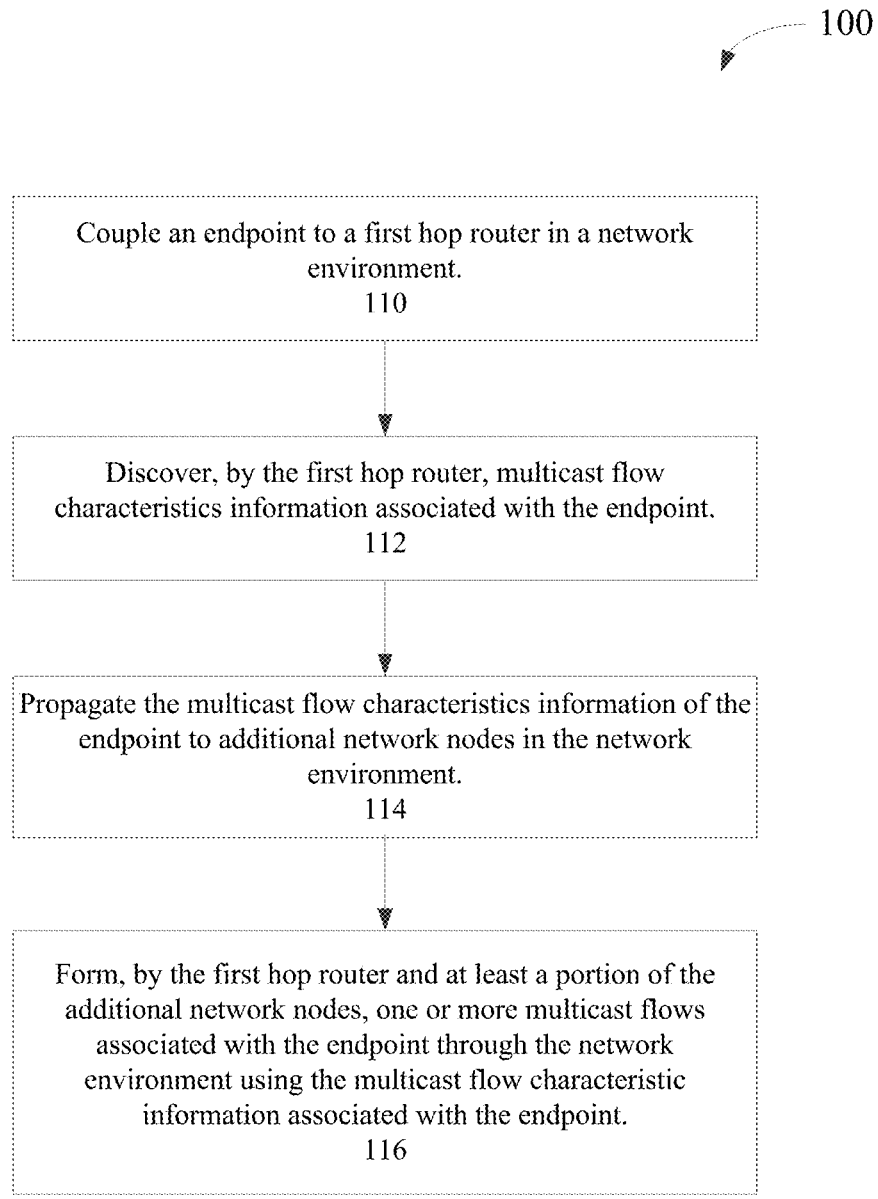
FIG. 1 illustrates a flowchart representation of forming multicast flows through a network environment in accordance with some embodiments.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Overview

Systems, methods, computer-readable media, and devices are disclosed for the dynamic discovery, update and propagation of multicast streams capabilities in a network. In one embodiment, a method can include an endpoint that can be coupled to a first hop router in a network environment. The first hop router can discover multicast flow characteristics information associated with the endpoint and propagate the multicast flow characteristics information of the endpoint to additional network nodes in the network environment. The first hop router and at least a portion of the additional network nodes can form one or more multicast flows associated with the endpoint through the network environment using the multicast flow characteristic information associated with the endpoint.

The systems, methods, computer-readable media, and devices may also include multicast flow characteristics information that can be propagated from the first hop router to the additional network nodes in the network environment. The multicast flow characteristics information can be, for example, discovered by the first hop router in response to the endpoint being coupled to the first hop router in the network environment. The multicast flow characteristics information associated with the endpoint can include one or a combination of an amount of data in a multicast flow associated with the endpoint, an indication of whether the endpoint is either or both a receiver and a source of the multicast flow associated with the endpoint, a multicast group address of the multicast flow associated with the endpoint, bandwidth requirements of the multicast flow associated with the endpoint, a differentiated services code point of the multicast flow associated with the endpoint, priority information of the multicast flow associated with the endpoint, and a bundle index of one or more flows bundled with the multicast flow associated with the endpoint. The first hop router can be configured to discover the multicast flow characteristics information from the endpoint using a link layer discovery protocol. For example, the link layer discovery protocol can be a media endpoint devices link layer discovery protocol. The first hop router can also receive one or more frames from the endpoint as part of discovering the multicast flow characteristics information from the endpoint using the link layer discovery protocol and the one or more frames can include one or a combination of a media endpoint device type-length value (TLV), a network policy TLV, a power management TLV, an inventory management TLV, a location TLV, a multicast group TLV, a multicast bandwidth TLV, a multicast differentiated services code point TLV, a multicast priority TLV, and a multicast bundle-index TLV. The multicast flow characteristics information can also be propagated from the first hop router to the additional network nodes in the network environment using a PIM flooding and source discovery (PFM-SD) mechanism. The multicast flow characteristics information can, for example, include one or a combination of a media endpoint device type-length value (TLV), a network policy TLV, a power management TLV, an inventory management TLV, a location TLV, a multicast group TLV, a multicast bandwidth TLV, a multicast differentiated services code point TLV, a multicast priority TLV, and a multicast bundle-index TLV propagated from the first hop router to the additional network nodes using the PFM-SD mechanism. The additional network nodes in the network environment can also be configured to add one or more multicast configurations corresponding to the multicast flow information in response to receiving the multicast flow information through the PFM-SD mechanism. One or a plurality of the first network nodes of the additional network nodes adjacent to the first hop router in the network environment can be configured to receive the multicast flow characteristics information directly from the first hop router according to the PFM-SD mechanism. The one or the plurality of the first network nodes of the additional network nodes can be configured to forward the multicast flow characteristics information to one or a plurality of second network nodes of the additional network nodes adjacent to the one or a plurality of the first network nodes according to the PFM-SD mechanism. Both the one or the plurality of the first network nodes and the one or the plurality of the second network nodes can be configured to selectively form the one or more multicast flow associated with the endpoint based on the multicast flow characteristics information received according to the PFM-SD mechanism. The multicast flow characteristics information of the endpoint can also be updated, and the updated multicast flow characteristics information can be propagated to the additional network nodes in the network environment using the PFM-SD mechanism.

In one embodiment, a system can include one or more processors and at least one computer-readable storage medium having stored therein instructions which, when executed by the one or more processors, cause the one or more processors to perform certain operations. For example, the one or more processors can couple an endpoint to a first hop router in a network environment. Multicast flow characteristics information associated with the endpoint can be discovered by the first hop router. The multicast flow characteristics information of the endpoint can be propagated from the first hop router to additional network nodes in the network environment. One or more multicast flows associated with the endpoint can be formed, by the first hop router and at least a portion of the additional network nodes, through the network environment using the multicast flow characteristic information associated with the endpoint.

In one embodiment, a non-transitory computer-readable storage medium can have stored therein instructions which, when executed by a processor, cause the processor to perform certain operations. For example, the processor can couple an endpoint to a first hop router in a network environment. Multicast flow characteristics information associated with the endpoint can be discovered by the first hop router, and the multicast flow characteristics information of the endpoint can be propagated to additional network nodes in the network environment for forming one or more multicast flows associated with the endpoint through the network environment.

Example Embodiments

The disclosed technology addresses the need in the art for automating the process of learning multicast stream capabilities and propagating this information to all the nodes in a network. The disclosure herein discloses two parts to a proposed solution that automates the discovery and propagation of multicast flows through a network: by a) learning or determining the per-flow capabilities from the host; and b) propagating the information of per-flow capabilities to all routers in the network.

For example, the solution can make it possible for a fabric to dynamically learn per-flow capabilities from the hosts and propagate this information throughout the network from a first hop router to all the nodes of the network. Once all the nodes in the network have learned the per-flow capabilities, some methodologies can choose the best path for a multicast flow and stitch the flows between the source and all the receivers.

Systems and methods accordingly provide for the dynamic discovery, update and propagation of multicast streams capabilities in a network. For example, an endpoint can be coupled to a first hop router in a network environment. The first hop router can discover multicast flow characteristics information associated with the endpoint and propagate the multicast flow characteristics information of the endpoint to additional network nodes in the network environment. The first hop router and at least a portion of the additional network nodes can form one or more multicast flows associated with the endpoint through the network environment using the multicast flow characteristic information associated with the endpoint.

Figure 2A:
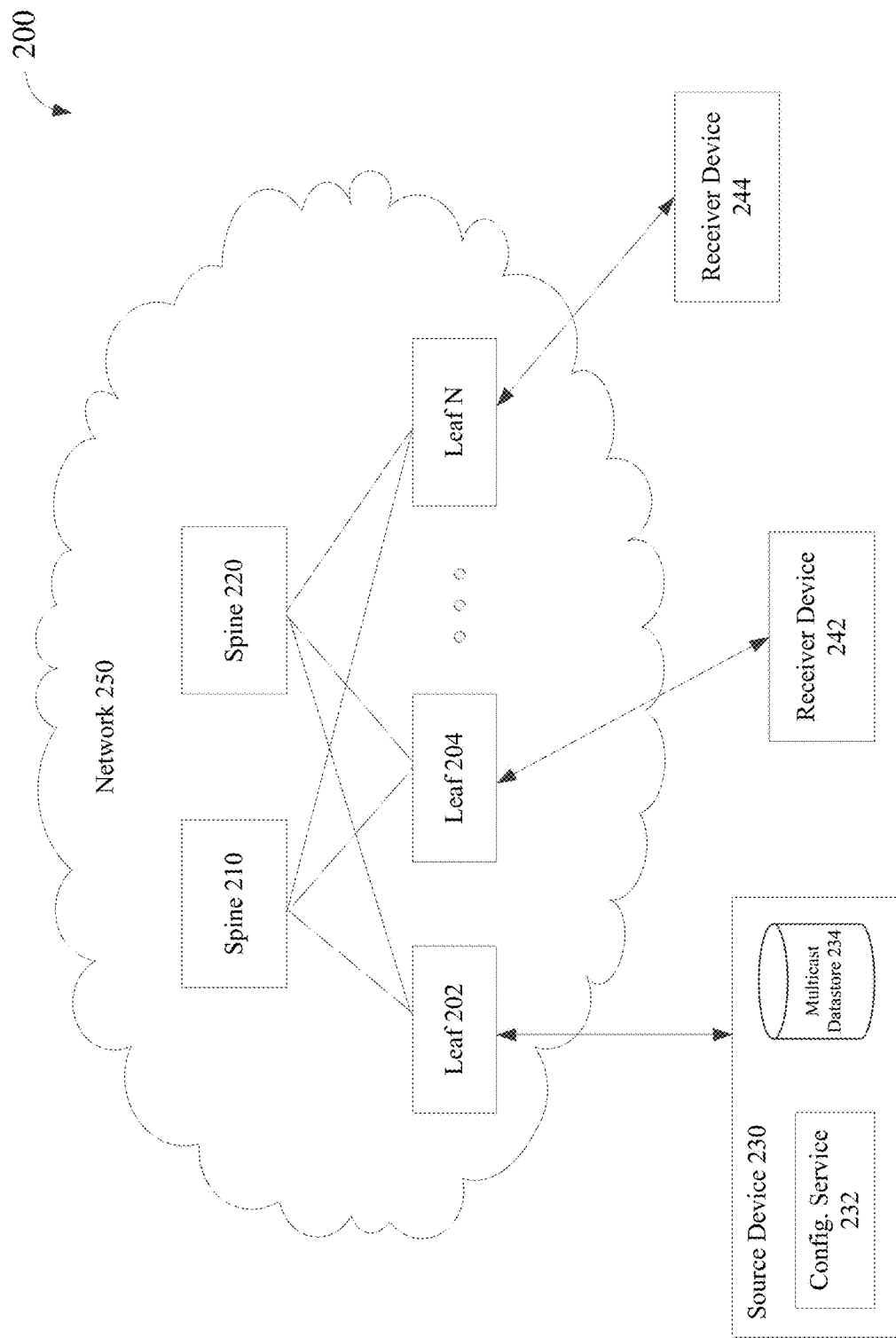
FIG. 2A shows an example schematic diagram of a multicast flow supported network environment in accordance with some embodiments.

FIG. 1 illustrates a flowchart representation of dynamically forming multicast flows through a network environment in accordance with some embodiments. Method 100 can begin by coupling an endpoint to a first hop router in a network environment (step 110). In multicast flows, for example, traffic from a single source is replicated towards multiple receivers. FIG. 2A shows an example schematic diagram of a multicast flow supported network environment in accordance with some embodiments In FIG. 2A, the network is illustrated as a leaf-spine topology. For ease of explanation, a Leaf Spine topology is used for this embodiment, although the topology for various embodiments can be flexible and various deployment scenarios are possible. System 200, for example, can include spines (e.g., spine 210 and spine 220) and leafs (e.g., leaf 202, leaf 204 . . . leaf N) within network 250. In the leaf-spine topology, leafs can be switches or routers that can connect to source devices, servers, and storage. Spines can be switches or routers to which leafs connect. Every leaf in the leaf-spine architecture can connect to every switch or router in the network fabric. For example, leaf 202 can, through its connection to the spines, be a router that connects to spine 210, spine 220, leaf 204 . . . leaf N.

For multicast flows, source device 230 can send traffic to multiple receivers. For example, source device 230 can replicate traffic towards receiver device 242 and receiver device 244. In some embodiments, the router that is attached to the source is the first hop router, which is the first router that receives the traffic. For example, leaf 202 is the first hop router that receives traffic from source device 230. Any number of routers and/or switches can receive the traffic from source device 230 thereafter, but the routers that send traffic from network 250 out to the receivers are called last hop routers. In system 200, for example, leaf 204 and leaf N are last hop routers, since they send traffic towards receiver device 242 and receiver device 244, respectively. Thus, while there can be a single first hop router, there can be any number of last hop routers and traffic will need to be replicated for all of the last hop routers.

For example, source device 230 can send replicated traffic (for example, streaming media such as IPTV or multipoint videocasting) to receiver device 242 and receiver device 244 in a one-to-many distribution. In a multicast communication, data transmission from source device 230 can be addressed to the group of destination devices (receiver device 242 and receiver device 244) simultaneously. To do this, copies of the traffic can be automatically created by network 230 to send to the group of destination devices in a single transmission. For example, the group communication may either be application layer multicast or network assisted multicast, where the latter makes it possible for the source device 230 to efficiently send to the group (receiver device 242 and receiver device 244) in a single transmission. Copies of the traffic can be automatically created in other network elements, such as routers, switches and cellular network base stations that make up leafs and spines, but only to network segments that currently contain members of the group. Network assisted multicast may be implemented at the data link layer using one-to-many addressing and switching such as Ethernet multicast addressing, Asynchronous Transfer Mode (ATM), point-to-multipoint virtual circuits (P2MP) or Infiniband multicast. Network assisted multicast may also be implemented at the Internet layer using IP multicast. In IP multicast the implementation of the multicast concept occurs at the IP routing level, where routers create optimal distribution paths for datagrams sent to a multicast destination address.

As a result, traffic from source device 230 can be replicated and/or copied for each receiver device, such that the traffic traversing the segment from leaf 202 to spine 210, then spine 210 to leaf 204, and then leaf 204 to receiver device 242 is the same as the traffic traversing the segment from leaf 202 to spine 220, then spine 220 to leaf N, and the leaf N to receiver device 244.

In some embodiments, when receiver device 244 joins network 250 as a new receiver device, network 250 can ensure bandwidth requirements are met. In multicast systems, problems can arise when the system does not check for bandwidth capabilities on a link for newly joined receivers. For example, whenever a receiver comes up, such as receiver device 244, the receiver asks network 250 to join. Network 250 chooses, via a controller, which spine to join to receiver 244—for example, network 250 can choose spine 210. This, however, is a random decision. Network 250 does not check if there is enough bandwidth on the link that joins leaf N to spine 210.

To solve this problem, configuration service 232 of source device 230 can assign a required flow for each bandwidth the multicast flows need. Then each router (leaf 202, leaf 204 . . . leaf N) can decide how much bandwidth is on any given link and choose a link that supports that bandwidth.

For example, configuration service 232 can generate or determine multicast flow characteristics information that describes bandwidth and other requirements for supporting multicast flows. These multicast flow characteristics can be stored within multicast datastore 234.

For each endpoint that connects with a router (any of leaf 202, leaf 204 . . . leaf N) in network 250, the router can discover multicast flow characteristics information associated with the endpoint (step 112). The multicast flow characteristics information associated with the endpoint can include, but is not limited to, one or a combination of an amount of data in a multicast flow associated with the endpoint, an indication of whether the endpoint is either or both a receiver and a source of the multicast flow associated with the endpoint, a multicast group address of the multicast flow associated with the endpoint, bandwidth requirements of the multicast flow associated with the endpoint, a differentiated services code point of the multicast flow associated with the endpoint, priority information of the multicast flow associated with the endpoint, and a bundle index of one or more flows bundled with the multicast flow associated with the endpoint.

For example, the first hop router can discover multicast flow characteristics information associated with the endpoint (step 112). For example, leaf 202 can discover that source device 230 is a source of a multicast flow, and that the multicast group address of the multicast flow associated with source device 230 includes receiver device 242 and receiver device 244. In some embodiments leaf 202 can discover the bandwidth requirements for the multicast flow, such as a bandwidth of 8 Mbps×4 Mbps. The multicast flow characteristics information can be discovered by leaf 202 in response to source device 230 being coupled to leaf 202 in network 250. In some embodiments, the first hop router (e.g., leaf 202) can be configured to discover the multicast flow characteristics information from the endpoint (e.g., source device 230) using a link layer discovery protocol, such as a link layer discovery protocol that can be a media endpoint devices link layer discovery protocol. The discovered multicast information can be utilized by leaf 202 to select the multiple paths for the replicated traffic to be directed towards, such as through one or more specific spines (e.g., spine 210 and/or spine 220) and then leafs (e.g., leaf 204 and/or leaf N) from source device 230 to receiver device 242 and receiver device 244. For example, leaf 202 can select spine 210 to direct traffic towards receiver device 242 through leaf 204 based on the associated links satisfying the bandwidth requirement of 8 Mbps×4 Mbps. Similarly, leaf 202 can select spine 220 to direct traffic towards receiver device 244 through leaf N based on the associated links also satisfying the bandwidth requirement of 8 Mbps×4 Mbps.

In some embodiments leaf 202 can be configured to discover the multicast flow characteristics information from source device 230 using the Link Layer Discovery Protocol. Link Layer Discovery Protocol (LLDP) and LLDP-Media Endpoint Discovery (MED) can use Type-Length-Values (TLVs) to exchange information between network and endpoint devices. TLV elements can be embedded, for example, in communications protocol advertisements and used for encoding information. Each LLDP frame can contain TLVs like Chassis ID, Port ID, and Time-to-Live. This list of TLVs can be extended to include additional information (e.x. Group information, Bandwidth information, Differentiated Services Code Point (DSCP) information, Priority information, Bundle index information) into the packets.

While there are several other ways to implement this discovery process, like an API call or via other mechanisms, for simplicity the one proposed in this solution can modify the LLDP protocol based on its TLV options. TLVs, for example, can support media operations for Voice over Internet Protocol (VoIP) applications. For example, LLDP for Media Endpoint Devices (LLDP-MED) can be an enhancement to LLDP that operates between endpoint devices, such as IP phones, and network devices, such as switches/routers. It can specifically provide support for voice over IP (VoIP) applications and provide media operations related TLVs. LLDP-MED can support, but is not limited to, the following example TLVs: network policy TLVs, power management TLVs, inventory management TLVs, and location TLVs.

In some embodiments, configuration service 230 can add multicast specific TLVs. These TLVs can include, but are not limited to: group TLVs (e.g., information, such as addresses, of source and receiver devices), bandwidth TLVs (e.g., bandwidth requirements for segment creation and traffic forwarding), Differentiated Services Code Point (DSCP) TLVs (e.g., packet header values that can be used to request high priority or best effort delivery for traffic), priority TLVs (e.g., information such as which links and/or network devices get higher or lower priority), and bundle-index TLVs (used, for example, when a multicast stream is bundled with other groups, such as multiple audio streams for a single video).

In some embodiments, the first hop router (leaf 202) can receive one or more frames from the endpoint (source device 230) as part of discovering the multicast flow characteristics information from the endpoint (source device 230). Leaf 202 can use the link layer discovery protocol and the one or more frames that can include the multicast flow characteristics information, such as one or a combination of a media endpoint device TLV, a network policy TLV, a power management TLV, an inventory management TLV, a location TLV, a multicast group TLV, a multicast bandwidth TLV, a multicast differentiated services code point TLV, a multicast priority TLV, and/or a multicast bundle-index TLV. The multicast flow characteristics information can then be propagated from the first hop router (leaf 202) to the additional network nodes (e.g., leaf and spine devices) using a Protocol Independent Multicast (PIM) Flooding Mechanism and Source Discovery (PFM-SD) mechanism. The Protocol Independent Multicast (PIM) is a family of multicast routing protocols for networks that provide one-to-many and many-to-many distribution of data, and the PIM Flooding Mechanism (PFM) is a protocol used to flood messages in the network by having each node send the message it received to all its neighbors.

In some embodiments, another discovery option can include an Internet Group Management Protocol (IGMP) extension for a host to learn if there are interested active sources. For example, the IGMP can be a communications protocol used by hosts and adjacent routers on IPv4 networks to establish multicast group memberships.

In some embodiments, some hosts may not support the discovery process detailed above. As a fallback option, the administrator may configure the first hop router (e.g., leaf 202) manually and still take advantage of the automated propagation process detailed in the process described by FIG. 2B.

Figure 2B:
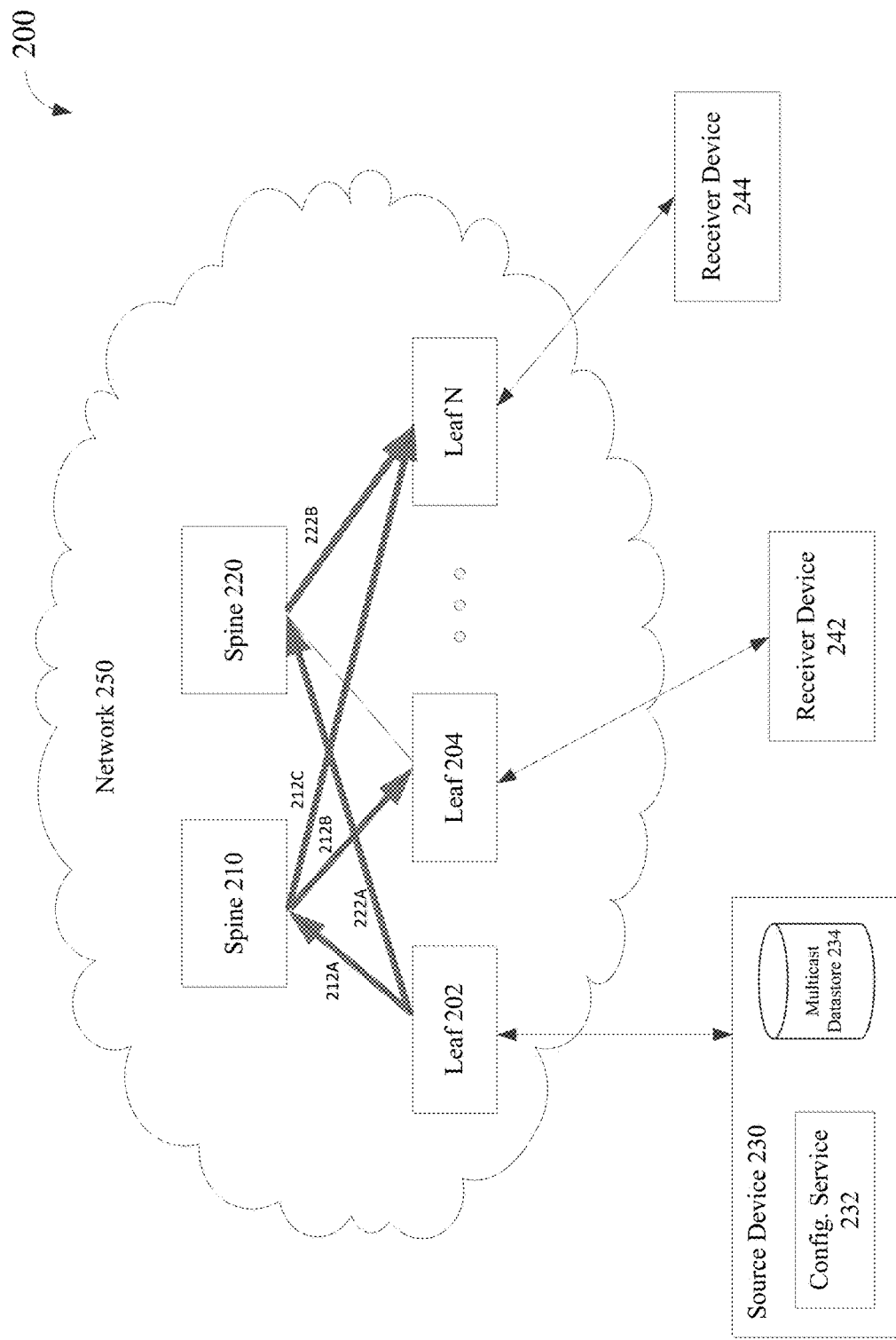
FIG. 2B shows an example schematic diagram of dynamically propagating multicast flow characteristics in a network environment in accordance with some embodiments.

FIG. 2B shows an example schematic diagram of propagating multicast flow characteristics in a network environment in accordance with some embodiments. In some embodiments, multicast flow characteristics information of an endpoint can be propagated to additional network nodes in the network environment (step 114). For example, the multicast flow characteristics information can be propagated from source device 230 to the first hop router (leaf 202) to the other network nodes in network 250, such as leaf 204, leaf N, spine 210, and spine 220. In some embodiments, the multicast flow characteristics information, which can be stored in multicast datastore 234 at source device 230, can be propagated from source device 230 to the first hop router (leaf 202), and then can be propagated to the additional network nodes in the network environment using the Protocol Independent Multicast (PIM) Flooding Mechanism and Source Discovery (PFM-SD) mechanism, such that each node in the network environment can be configured to support the multicast flow requirements for source device 230. For example, the multicast flow characteristics information can be replicated and copied from source device 230 to leaf 202, and then replicated and copied to spine 210 and spine 220, and then replicated and copied to leaf 204 and leaf N, etc.

In some embodiments, the PFM-SD protocol can send a message to leaf and spine devices within network 250 that specify that a specific source, such as source device 230, needs to send traffic via specific groups that include receiver device 242 and receiver device 244. For example, spine 210 and spine 220 can receive the message. Spine 210 can then, for example, store the content of the message, which can include multicast flow characteristics information, and then send that content to every leaf device (e.g., leaf 204 and leaf N) except the leaf that it received it from (e.g., leaf 202). This process can be repeated for spine 220, which can send the content of the message, including the multicast flow characteristics information, to every leaf device (e.g., leaf 204 and leaf N) except the leaf that it received it from (e.g., leaf 202). This process floods network 250. In some embodiments, all the devices within network 250 receive the multicast flow characteristics information. In other embodiments, only devices within the groups (e.g., segments which include the receiver devices 242, 244) that matter receive the multicast flow characteristics information. The message can be a configuration message with configuration capabilities for each leaf or spine.

Accordingly, in some embodiments, system 200 can propagate the configuration for multicast flows to all the nodes and/or to all the nodes within the group (e.g., segments which include the receiver devices 242, 244). For example, on each router, a required bandwidth for each multicast group can be specified. So whenever a receiver device (e.g., receiver device 242) through its last hop router (e.g., leaf 204) wants to join network 250 and receive traffic from the source device (e.g., source device 230), an appropriate spine can be selected based on which link to send the join request. Based on the bandwidth and other multicast flow characteristics information propagated from source device 230, the available bandwidth left on the links to each spine and leaf can be checked by the router (e.g., leaf 204) based on how much bandwidth is currently in use. If there is enough available bandwidth on particular links, then those links will be chosen by the router (e.g., leaf 204) over links that do not have enough available bandwidth.

Similarly, when receiver device 244 requests to join network 250, which can be a bandwidth managed network, in order to receive traffic from source device 230, the multicast flow characteristics information can be propagated to all the spine and leaf devices so that the flow to receiver 244 can be consistent with the multicast flow characteristics information for source device 230. For example, leaf 202 can propagate the multicast flow characteristics to spine 210 through path 212A and to spine 220 through path 222A. Each spine can then propagate the multicast flow characteristics to its leafs; e.g., spine 210 can send the multicast flow characteristics to leaf 204 through path 212B and leaf N through path 212C; and spine 220 can send the multicast flow characteristics to leaf N through path 222B.

In embodiments, the first hop router can determine and select which nodes in network 250 to direct traffic towards in order to satisfy the multicast flow characteristics requirements. For example, leaf 202 can decide that, based on the multicast flow characteristics information needed by source device 230, the flow to receiver device 244 should follow links in which the last hop router is leaf N. Leaf 202 can also decide that a path through spine 210, rather than through spine 220, provides the links with the best match to the multicast flow characteristics information. Accordingly, leaf 202 will configure network 250 to send traffic from source device 230 towards spine 210 through path 212A, and then towards leaf N through path 212C. This path, for example, can be determined and/or selected by leaf 202 based on the links (e.g., link 212A and link 212C) satisfying the bandwidth requirements specified in the multicast flow characteristics information stored within multicast datastore 234. The decision and/or selection by the first hop router (e.g., leaf 202) based on the propagated multicast flow characteristics information from source device 230 can enable the first hop router to self-configure and/or self-adjust multicast traffic flows without the need for a controller or administrator. In fact, since every device within network 250 has the propagated multicast flow characteristics information from source device 230, any device (e.g., leaf or spine) can self-configure and/or self-adjust multicast traffic flows without the need for a controller or administrator. As a result, even if the controller or administrator or other device within network 250 loses connection to a spine or router or any device within network 250, all the multicast flow characteristics information is adjusted via itself (once a router [e.g., leaf 202] floods the network with the multicast flow characteristics information). The configuration information and capabilities can come from the source device 230 itself.

In some embodiments, leaf 202 can use the PIM Flooding Mechanism (PFM) to distribute source information (multicast flow characteristics information) into the network 250. Along with the distribution of source information, source discovery messages can also distribute media specific attributes like the ones needed to configure a capability-aware multicast network. Since PFM is the protocol used to flood messages in the network 250 by having each node send the message it received to all its neighbors, leaf 202 can learn Host multicast capabilities via that mechanism and can send the PIM Flooding Mechanism Source Discovery (PFM-SD) information. This can require the addition of new TLVs in the PFM-SD packets to support media properties. Every router can then examine the PFM-SD and add the configuration information contained in it, such as the multicast flow characteristics information. Each router can then transmit the multicast flow characteristics information on all of its PIM neighbors. In that way, every router along the path learns the per-flow capabilities. When the last hop router (leaf N), for example, receives the PFM-SD through the reverse path forwarding (RPF) path towards source device 230, leaf N can now choose the best link to join the shortest path tree (SPT) using only links that have enough bandwidth available.

In some embodiments, the periodic PFM-SD can refresh the data learned by the first hop router. This can make it easy to update the per-stream capabilities since no controller is involved in the operation and the network adjusts itself simply via protocol exchange messages. However, a controller may still need to change the parameters on the source endpoints that will then be advertised in the LLDP packets.

In some embodiments, based on the multicast flow characteristics information being propagated to the network nodes (leaf and spine devices), one or more multicast flows associated with the endpoint (e.g., source device 230) can be formed through the network environment using the multicast flow characteristic information associated with the endpoint (step 116). The one or more multicast flows can be formed, for example, by the first hop router and at least a portion of the additional network nodes, where the additional network nodes in the network environment can be configured to add one or more multicast configurations corresponding to the multicast flow information in response to receiving the multicast flow information through PFM-SD mechanism. For example, leaf 202, spine 210, and leaf 204 can form a first multicast flow to receiver device 242 based on receiving the multicast flow information from source device 230 through the PFM-SD mechanism. Similarly, leaf 202, spine 220, and leaf N can form a second multicast flow to receiver device 244 based on receiving the multicast flow information from source device 230 through the PFM-SD mechanism. In both cases, each leaf and spine device can configure itself for the multicast flow based on receiving the propagated multicast flow information from source device 230.

In some embodiments, one or more network nodes (not pictured, such as one or more leaf devices between leaf 202 and a last hop router, such as leaf N) of the additional network nodes can be adjacent to the first hop router in the network environment. In some embodiments, these adjacent network nodes can be configured to receive the multicast flow characteristics information directly from the first hop router according to the PFM-SD mechanism. The adjacent nodes can then be configured to forward the multicast flow characteristics information to a second set of network nodes of the additional network nodes adjacent to the adjacent network nodes according to the PFM-SD mechanism. This process can continue until all the network nodes have received the multicast flow characteristics information, and a portion of the network nodes can be configured to selectively form the one or more multicast flow associated with the endpoint based on the multicast flow characteristics information received according to the PFM-SD mechanism. In some embodiments, only the nodes within a segment containing the receiver devices 242, 244 can receive and forward (to other nodes within the segment) the multicast flow characteristics information.

For each flow in the multicast, multiple parameters relating to the multicast flow characteristics information may need to be configured on each router (e.g., the same configuration can be replicated on all the routers). In order to avoid having to configure every time a group comes onto network 250, the multicast flow characteristics information for source device 230 can be learned on leaf 202 from the host itself. The multicast flow characteristics information can include information that tells leaf 202 that source device 230 needs to send leaf 202 some traffic. In some embodiments, the multicast flow characteristics information can tell leaf 202 that source device 230 plans to send traffic on a specific group (e.g., a group containing receiver device 242 and receiver device 244). The multicast flow characteristics information can furthermore tell leaf 202 that the traffic will use a certain amount of bandwidth, as well as the priority the traffic will be using. Once leaf 202 learns about these traffic properties, it can then distribute this information to all the nodes (or relevant nodes within the group) on network 250.

As a result, if receiver device 244 requests to join network 250 through leaf N, then leaf N already knows the multicast flow characteristics information associated with traffic from source device 230. Using this information, leaf N can choose spine 210 or spine 220 that can provide a link with enough bandwidth.

In some embodiments, the multicast flow characteristics information of the endpoint can be updated. For example, configuration service 232 of source device 230 may update its multicast flow characteristics information stored within multicast datastore 234. The updated multicast flow characteristics information can be propagated to leaf 202 and the additional network nodes in the network environment using the PFM-SD mechanism. In this way, network 250 can self-adjust to any updates to the multicast flow characteristics information without the need for a central controller or configuration from an Administrator.

The techniques described above, such as the discovery and propagation processes, can make the discovery of media flow capabilities simple and automatic. It can require no configuration by an Administrator to be pushed on the routers in the network in order to work (which can be tedious and prone to error for an Administrator managing large and ever changing networks), and it has a single source of truth (since the propagation starts from the first hop router). This avoids any inconsistencies of the network configuration across multiple routers that are present in previous solutions. Moreover, the techniques can be applied to any type of network topology, not just the Leaf-Spine network topology in the example embodiments. Customers can now fully orchestrate the operations of their media network, removing a huge part of the manual configuration process that is required today for IPFM (and in general any capability-based multicast network) embedding these configurations in the protocol itself. Customers also can have a single point of configuration of the flow parameters instead of potentially hundreds of them, since the discovery of these capabilities uses the host itself.

Figure 3:
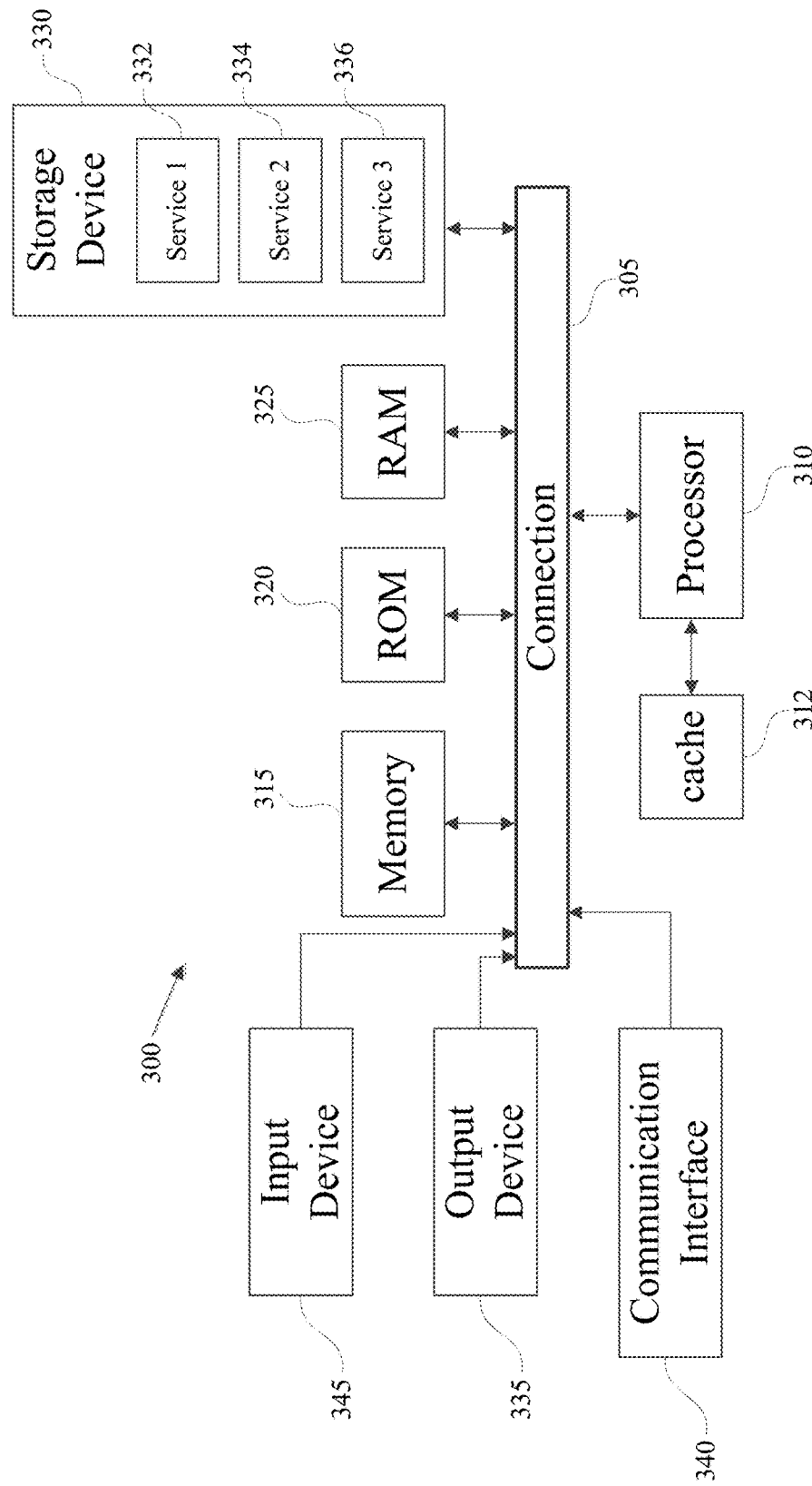
FIG. 3 shows an example of a system for implementing certain aspects of the present technology.

FIG. 3 shows an example of computing system 300 in which the components of the system, such as the components of FIGS. 2A-2B, are in communication with each other using connection 305. Connection 305 can be a physical connection via a bus, or a direct connection into processor 310, such as in a chipset architecture. Connection 305 can also be a virtual connection, networked connection, or logical connection.

In some embodiments computing system 300 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 300 includes at least one processing unit (CPU or processor) 310 and connection 305 that couples various system components including system memory 315, such as read only memory (ROM) and random access memory (RAM) to processor 310. Computing system 300 can include a cache of high-speed memory connected directly with, in close proximity to, or integrated as part of processor 310.

Processor 310 can include any general purpose processor and a hardware service or software service, such as services 332, 334, and 336 stored in storage device 330, configured to control processor 310 as well as a special-purpose processor where software instructions are incorporated into the actual processor design. Processor 310 may essentially be a completely self-contained computing system, containing multiple cores or processors, a bus, memory controller, cache, etc. A multi-core processor may be symmetric or asymmetric.

To enable user interaction, computing system 300 includes an input device 345, which can represent any number of input mechanisms, such as a microphone for speech, a touch-sensitive screen for gesture or graphical input, keyboard, mouse, motion input, speech, etc. Computing system 300 can also include output device 335, which can be one or more of a number of output mechanisms known to those of skill in the art. In some instances, multimodal systems can enable a user to provide multiple types of input/output to communicate with computing system 300. Computing system 300 can include communications interface 340, which can generally govern and manage the user input and system output. There is no restriction on operating on any particular hardware arrangement and therefore the basic features here may easily be substituted for improved hardware or firmware arrangements as they are developed.

Storage device 330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 330 can include software services, servers, services, etc., that when the code that defines such software is executed by the processor 310, it causes the system to perform a function. In some embodiments, a hardware service that performs a particular function can include the software component stored in a computer-readable medium in connection with the necessary hardware components, such as processor 310, connection 305, output device 335, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
    coupling, by at least one processor, an endpoint to a first hop router in a network environment;
    based on the endpoint being coupled to the first hop router in the network environment, discovering, by the first hop router and from the endpoint, multicast flow characteristics information associated with the endpoint, the multicast flow characteristics including at least one of or a combination of a per-flow capability of the endpoint and a type-length value (TLV);
    propagating, by the first hop router, the multicast flow characteristics information of the endpoint to additional network nodes in the network environment, wherein a set of the additional network nodes adds one or more multicast configurations in response to receiving the propagated multicast flow characteristics information of the endpoint; and
    forming, by the first hop router and at least a portion of the set of the additional network nodes, one or more multicast flows associated with the endpoint through the network environment, wherein the one or more multicast flows are formed based on the multicast flow characteristic information associated with the endpoint.

2. The method of claim 1, wherein the per-flow capability of the endpoint includes one or a combination of an amount of data in a multicast flow associated with the endpoint, an indication of whether the endpoint is either or both a receiver and a source of the multicast flow associated with the endpoint, a multicast group address of the multicast flow associated with the endpoint, bandwidth requirements of the multicast flow associated with the endpoint, a differentiated services code point of the multicast flow associated with the endpoint, priority information of the multicast flow associated with the endpoint, and a bundle index of one or more flows bundled with the multicast flow associated with the endpoint.

3. The method of claim 1, wherein the first hop router is configured to discover the multicast flow characteristics information from the endpoint using a link layer discovery protocol.

4. The method of claim 3, wherein the link layer discovery protocol is a media endpoint devices link layer discovery protocol.

5. The method of claim 4, wherein the first hop router received one or more frames from the endpoint as part of discovering the multicast flow characteristics information from the endpoint using the link layer discovery protocol and the one or more frames include one or a combination of a media endpoint device type-length value (TLV), a network policy TLV, a power management TLV, an inventory management TLV, a location TLV, a multicast group TLV, a multicast bandwidth TLV, a multicast differentiated services code point TLV, a multicast priority TLV, and a multicast bundle-index TLV.

6. The method of claim 1, wherein the multicast flow characteristics information is propagated from the first hop router to the additional network nodes in the network environment using a Protocol Independent Multicast (PIM) flooding and source discovery (PFM-SD) mechanism.

7. The method of claim 1, wherein the TLV includes one or a combination of a media endpoint device TLV, a network policy TLV, a power management TLV, an inventory management TLV, a location TLV, a multicast group TLV, a multicast bandwidth TLV, a multicast differentiated services code point TLV, a multicast priority TLV, and a multicast bundle-index TLV propagated from the first hop router to the additional network nodes using the PFM-SD mechanism.

8. The method of claim 6, wherein the additional network nodes in the network environment are configured to add one or more multicast configurations corresponding to the multicast flow information in response to receiving the multicast flow information through PFM-SD mechanism.

9. The method of claim 6, wherein one or a plurality of first network nodes of the additional network nodes adjacent to the first hop router in the network environment are configured to receive the multicast flow characteristics information directly from the first hop router according to the PFM-SD mechanism.

10. The method of claim 9, wherein the one or the plurality of the first network nodes of the additional network nodes are configured to forward the multicast flow characteristics information to one or a plurality of second network nodes of the additional network nodes adjacent to the one or a plurality of the first network nodes according to the PFM-SD mechanism.

11. The method of claim 10, wherein both the one or the plurality of the first network nodes and the one or the plurality of the second network nodes are configured to selectively form the one or more multicast flow associated with the endpoint based on the multicast flow characteristics information received according to the PFM-SD mechanism.

12. The method of claim 6, further comprising:
updating the multicast flow characteristics information of the endpoint; and
propagating the updated multicast flow characteristics information to the additional network nodes in the network environment using the PFM-SD mechanism.

13. A system comprising:
one or more processors; and
at least one computer-readable storage medium having stored therein instructions which, when executed by the one or more processors, cause the one or more processors to:
couple an endpoint to a first hop router in a network environment;
based on the endpoint being coupled to the first hop router in the network environment, discover, by the first hop router and from the endpoint, multicast flow characteristics information associated with the endpoint, the multicast flow characteristics including at least one of or a combination of a per-flow capability of the endpoint and a type-length value (TLV);
propagate, by the first hop router, the multicast flow characteristics information of the endpoint to additional network nodes in the network environment, wherein a set of the additional network nodes adds one or more multicast configurations in response to receiving the propagated multicast flow characteristics information of the endpoint; and
form, by the first hop router and at least a portion of the set of the additional network nodes, one or more multicast flows associated with the endpoint through the network environment, wherein the one or more multicast flows are formed based on the multicast flow characteristic information associated with the endpoint.

14. The system of claim 13, wherein the per-flow capability of the endpoint includes one or a combination of an amount of data in a multicast flow associated with the endpoint, an indication of whether the endpoint is either or both a receiver and a source of the multicast flow associated with the endpoint, a multicast group address of the multicast flow associated with the endpoint, bandwidth requirements of the multicast flow associated with the endpoint, a differentiated services code point of the multicast flow associated with the endpoint, priority information of the multicast flow associated with the endpoint, and a bundle index of one or more flows bundled with the multicast flow associated with the endpoint.

15. The system of claim 13, wherein the first hop router is configured to discover the multicast flow characteristics information from the endpoint using a link layer discovery protocol.

16. The system of claim 13, wherein the multicast flow characteristics information is propagated from the first hop router to the additional network nodes in the network environment using a Protocol Independent Multicast (PIM) flooding and source discovery (PFM-SD) mechanism.

17. The system of claim 13, wherein the TLV includes one or a combination of a media endpoint device TLV, a network policy TLV, a power management TLV, an inventory management TLV, a location TLV, a multicast group TLV, a multicast bandwidth TLV, a multicast differentiated services code point TLV, a multicast priority TLV, and a multicast bundle-index TLV propagated from the first hop router to the additional network nodes using the PFM-SD mechanism.

18. A non-transitory computer-readable storage medium having stored therein instructions which, when executed by a processor, cause the processor to:
couple an endpoint to a first hop router in a network environment;
based on the endpoint being coupled to the first hop router in the network environment, discover, by the first hop router and from the endpoint, multicast flow characteristics information associated with the endpoint, the multicast flow characteristics including at least one of or a combination of a per-flow capability of the endpoint and a type-length value (TLV);
propagate, by the first hop router, the multicast flow characteristics information of the endpoint to additional network nodes in the network environment, wherein a set of the additional network nodes adds one or more multicast configurations in response to receiving the propagated multicast flow characteristics information of the endpoint; and
form, by the first hop router and at least a portion of the set of the additional network nodes, one or more multicast flows associated with the endpoint through the network environment, wherein the one or more multicast flows are formed based on the multicast flow characteristic information associated with the endpoint.

19. The non-transitory computer-readable storage medium of claim 18, wherein the first hop router is configured to discover the multicast flow characteristics information from the endpoint using a link layer discovery protocol.

20. The non-transitory computer-readable storage medium of claim 18, wherein the multicast flow characteristics information is propagated from the first hop router to the additional network nodes in the network environment using a Protocol Independent Multicast (PIM) flooding and source discovery (PFM-SD) mechanism.

* * * * *